(12) United States Patent
Berzin et al.

(10) Patent No.: US 9,647,935 B2
(45) Date of Patent: May 9, 2017

(54) INTER-LAYER QUALITY OF SERVICE PRESERVATION

(71) Applicants: Verizon Patent and Licensing Inc., Arlington, VA (US); Cellco Partnership, Arlington, VA (US)

(72) Inventors: Oleg Berzin, Huntingdon Valley, PA (US); Richard Janocko, Clark, NJ (US); Raymond So, San Ramon, CA (US); James Mathison, Warren, NJ (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 73 days.

(21) Appl. No.: 14/061,514

(22) Filed: Oct. 23, 2013

(65) Prior Publication Data
US 2015/0110009 A1   Apr. 23, 2015

(51) Int. Cl.
*H04B 7/212* (2006.01)
*H04L 12/725* (2013.01)

(52) U.S. Cl.
CPC ................................ *H04L 45/302* (2013.01)

(58) Field of Classification Search
CPC ............................. H04L 45/302; H04L 45/50
USPC ................................................. 370/310–350
See application file for complete search history.

(56) References Cited

U.S. PATENT DOCUMENTS

| | | | |
|---|---|---|---|
| 8,761,091 B2 | 6/2014 | Zisimopoulos et al. | |
| 8,824,412 B2 | 9/2014 | Zisimopoulos et al. | |
| 9,288,816 B2 | 3/2016 | Paladugu | |
| 2009/0225719 A1* | 9/2009 | Zhi | H04L 12/5695 370/329 |
| 2012/0155298 A1* | 6/2012 | Yang et al. | 370/252 |
| 2014/0050168 A1 | 2/2014 | Zisimopoulos et al. | |
| 2014/0064070 A1 | 3/2014 | Paladugu et al. | |
| 2014/0064071 A1 | 3/2014 | Paladugu et al. | |
| 2015/0063101 A1* | 3/2015 | Touati et al. | 370/230 |
| 2015/0092688 A1* | 4/2015 | Jeong | H04W 60/005 370/329 |

(Continued)

OTHER PUBLICATIONS

IEEE computer Society, "IEEE Standard for Local and Metropolitan Area Networks; Virtual Bridged Local Area Networks," IEEE Std 802.1Q(TM)-2005, May 29, 2006.

(Continued)

*Primary Examiner* — Ricky Ngo
*Assistant Examiner* — Wei-Po Kao

(57) ABSTRACT

A server device may store inter-layer quality of service ("QoS") information, indicating a set of link layer QoS levels that are associated with a particular device, a set of network layer QoS levels that are associated with the set of link layer QoS levels, and a set of MPLS QoS levels that are associated with the set of link layer QoS levels. A network device may establish a set of bearers, that correspond to the set of link layer QoS levels, with a particular device; output information regarding the set of network layer QoS levels that are associated with the set of link layer QoS levels, to allow the particular device to select a bearer, of the set of bearers, via which to output traffic to the network device; receive, from the particular device, traffic via the bearer; and determine a particular MPLS QoS level associated with the received traffic.

18 Claims, 15 Drawing Sheets

(56) References Cited

U.S. PATENT DOCUMENTS

2016/0227467 A1   8/2016   Tomici et al.
2016/0234124 A1   8/2016   Tomici et al.

OTHER PUBLICATIONS

3GPP, "Technical Specification Group Services and System Aspects; General Packet Radio Service (GPRS) enhancements for Evolved Universal Terrestrial Radio Access Network (E-UTRAN) access (Release 12)," 3GPP TS 23.401 v12.2.0, Sep. 2013.
3GPP, "Technical Specification Group Core Network and Terminals; Rx Interface and Rx/Gx Signalling Flows (Release 6)," 3GPP TS 29.211 v6.4.0, Jun. 2007.
3GPP, "Technical Specification Group Core Network and Terminals; Policy and Charging Control (PCC); Reference points (Release 12)," 3GPP TS 29.212 v12.1.0, Jun. 2013.
K. Nichols et al., "Definition of the Differentiated Services Field (DS Field) in the IPv4 and IPv6 Headers," Network Working Group RFC 2474, Dec. 1998.
E. Rosen et al., "MPLS Label Stack Encoding," Network Working Group RFC 3032, Jan. 2001.
B. Davie, et al., "An Expedited Forwarding PHB (Per-Hop Behavior)," Network Working Group RFC 3246, Mar. 2002.
D. Grossman, "New Terminology and Clarifications for Diffserv," Network Working Group RFC 3260, Apr. 2002.
J. Babiarz, "Configuration Guidelines for DiffServ Service Classes," Network Working Group RFC 4594, Aug. 2006.
L. Andersson et al., "Multiprotocol Label Switching (MPLS) Label Stack Entry: 'EXP' Field Renamed to 'Traffic Class' Field," Network Working Group RFC 5462, Feb. 2009.
IEEE computer Society, "IEEE Standard for Local and Metropolitan Area Networks; Media Access Control (MAC) Bridges and Virtual Bridge Local Area Networks," IEEE Std 8021 Q(TM)-2011, Aug. 31, 2011.

\* cited by examiner

300

| DSCP value(s) | Description | QCI |
|---|---|---|
| EF | Voice calls | 1* or 7 |
| AF41 | Video Calls | 7 |
| AF31, AF32, AF33 | Mission-critical data | 7 |
| AF21, AF22, AF23 | Transactional data | 8 |
| AF11, AF12, AF13 | Bulk data | 8 |
| CS6, CS7 | Network/Internet control | 8 |
| 0 | Best effort | 8 |

| DSCP class selector(s) | Description | QCI |
|---|---|---|
| 5 | Voice calls | 1* or 7 |
| 4 | Video Calls | 7 |
| 3 | Mission-critical data | 7 |
| 2 | Transactional data | 8 |
| 1 | Bulk data | 8 |
| 6, 7 | Network/Internet control | 8 |
| 0 | Best effort | 8 |

| QCI | MPLS traffic class |
|-----|--------------------|
| 1   | CoS1               |
| 7   | CoS2               |
| 8   | CoS3               |

FIG. 4

INTER-LAYER QUALITY OF SERVICE PRESERVATION

BACKGROUND

Networks, such as wireless telecommunications networks, allow for communication between user devices (such as cellular telephones) and other devices (such as servers, other user devices, etc.). Traffic to and/or from user devices may traverse multiple different network devices, such as base stations and/or gateways, and links between the network devices. These network devices may each employ different techniques for ensuring quality of service ("QoS") for traffic associated with the user devices. These QoS techniques may be applied at different layers of the Open Systems Interconnection ("OSI") model. For example, an application may specify a level of QoS at the network layer (e.g., OSI layer 3). While a network may enforce the requested QoS at the network layer, a transport network may not necessarily apply a link layer (e.g., OSI layer 2) QoS that appropriately corresponds to the requested network layer QoS.

BRIEF DESCRIPTION OF THE DRAWINGS

FIGS. 3A, 3B, and 4 illustrate example data structures that may be stored and/or utilized by an Inter-Layer QoS engine, in accordance with some implementations;

DETAILED DESCRIPTION OF PREFERRED EMBODIMENTS

The following detailed description refers to the accompanying drawings. The same reference numbers in different drawings may identify the same or similar elements.

User devices, such as wireless telephones, may send and receive traffic, such as traffic associated with voice calls, video calls, file transfer, control signaling, etc. Based on the type of application that traffic is associated with, a user device (and/or a router, via which the traffic is transmitted) may mark the traffic with a QoS marking (such as a network layer, (e.g., OSI layer 3), QoS marking), which may specify how the traffic should be treated, at the network level, by devices via which the traffic is routed. Even though some traffic may be marked with a desired network layer QoS, existing systems may fail to apply appropriate QoS treatment at other layers (e.g., at the link layer, or OSI layer 2).

Figure 1A:
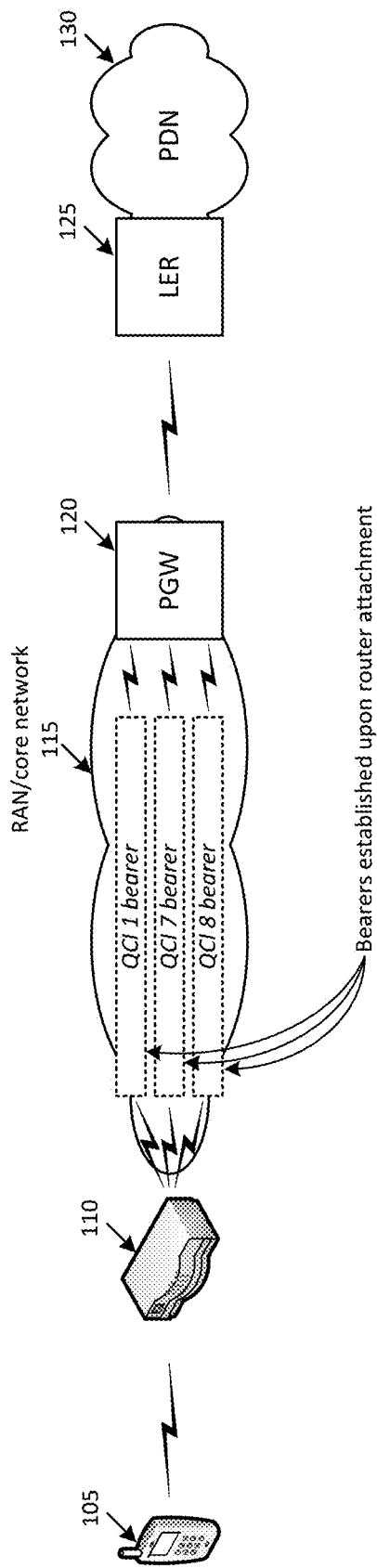
FIGS. 1A and 1B illustrate an example overview of one or more implementations described herein.

Some implementations described herein may allow for the identification of network layer QoS markings of traffic, and the application of link layer QoS treatment of the traffic based on the network layer QoS markings. For example, as shown in FIG. 1A, user device 105 may be communicatively coupled to packet data network ("PDN") 130 via router 110 and RAN/core network 115. Router 110 may include, for example, a mobile enterprise router, which communicates wirelessly with RAN/core network 115, which may include a Long Term Evolution ("LTE") network. Upon initial attachment of router 110 with RAN/core network 115 (and/or at another time), multiple bearers between router 110 and one or more devices of RAN/core network 115 (e.g., PDN gateway ("PGW") 120) may be established. These multiple bearers may each correspond to different link layer QoS levels. In the context of an LTE network, a link layer QoS level may be referred to as a QoS Class Identifier ("QCI"). As illustrated, one bearer may correspond to QCI 1, one bearer may correspond to QCI 7, and one bearer may correspond to QCI 8.

As described further below, router 110 may receive and/or store information that correlates network layer QoS levels to link layer QoS levels (e.g., QCIs). As also described further below, PGW 120 may receive and/or store information that correlates link layer QoS levels to Multiprotocol Label Switching ("MPLS") QoS levels (e.g., MPLS traffic classes).

Figure 1B:
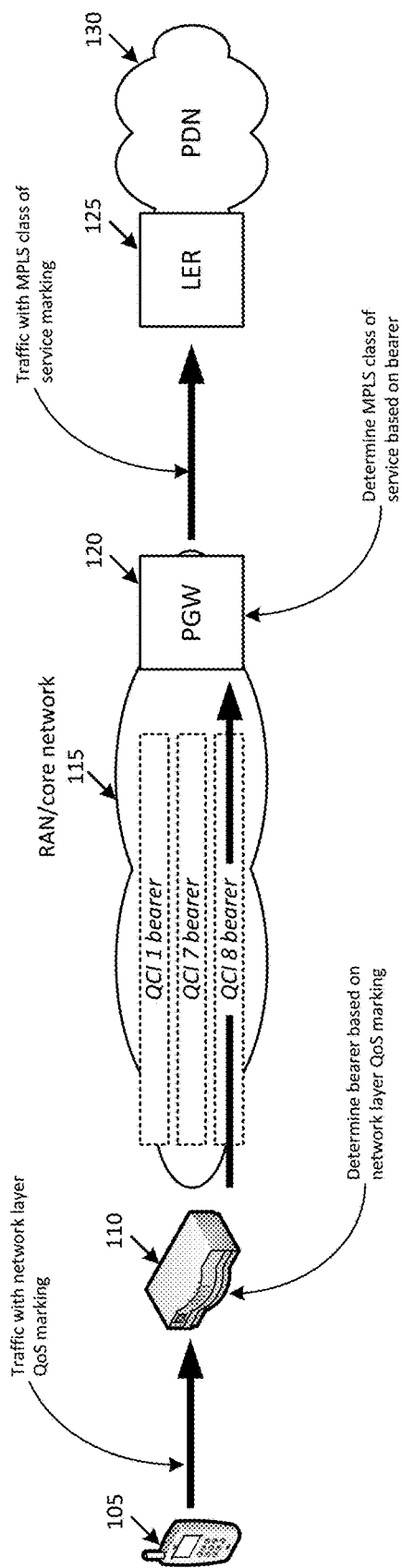

As shown in FIG. 1B, user device 105 may output traffic to PDN 130, via router 110 and RAN/core network 115. The traffic may include a network layer QoS marking such as, for example, a Differentiated Service ("DiffServ") Code Point ("DSCP") value in an Internet Protocol ("IP") header of the traffic. Router 110 may identify a QCI level associated with the DSCP value associated with the traffic and may output the traffic via the appropriate bearer. For example, as shown in FIG. 1B, router 110 may identify that the network layer QoS marking of the traffic is associated with QCI level 8, and may output the traffic to RAN/core network 115 via the associated bearer ("QCI 8 bearer," in FIG. 1B).

PGW 120 may identify an MPLS QoS level (e.g., MPLS traffic class) associated with the QCI level of the bearer via which the traffic was received. PGW 120 may mark the received traffic with an MPLS traffic class, such as by encapsulating the received traffic in one or more MPLS packets, and marking a "Traffic Class" field of a header of the MPLS packet(s) with the identified traffic class. PGW 120 may forward the MPLS packet(s) to PDN 130. One or more components of PDN 130, such as Label Edge Router ("LER") 125, may receive the MPLS packet(s), and may extract the original traffic (e.g., as outputted by user device 105). Elements of PDN 130 (such as LER 125 and/or other devices associated with PDN 130) may treat the extracted traffic according to the network layer QoS marking originally specified by user device 105.

In some implementations, inter-layer QoS treatment may be provided on a subscription basis. For example, router 110 may be an enterprise router owned by an enterprise-level customer who may have purchased a subscription to the inter-layer QoS treatment described above. As another example, in some implementations, individual user devices 105 may be associated with such a subscription, and may perform inter-layer QoS functions similar to those described above with respect to router 110. In some implementations, a provider of RAN/core network 115 may provide an application programming interface ("API"), which may allow a subscriber to specify correlations between network layer QoS levels (e.g., DSCP values) and link layer QoS levels (e.g., QCI levels).

By providing QoS treatment on a different layer than is specified by traffic itself, some implementations may allow for more consistent, predictable, and accurate end-to-end QoS treatment of traffic. Further, by providing the opportunity for subscribers to specify lower layer QoS levels that are associated with network layer QoS levels, some implementations described herein may provide a way for subscribers to have enhanced levels of access to lower layer QoS treatment mechanisms, which were not previously available. Some implementations described herein do not rely on the interworking between applications running on user devices and the associated application servers and/or application functions (with or without the use of Application Layer Gateways and/or APIs), residing inside or outside of the service provider's IMS infrastructure, to allow the applications to invoke link QoS levels. Instead, some implementations provide an application-independent method of mapping between network layer QoS levels and link layer QoS levels.

Figure 2:
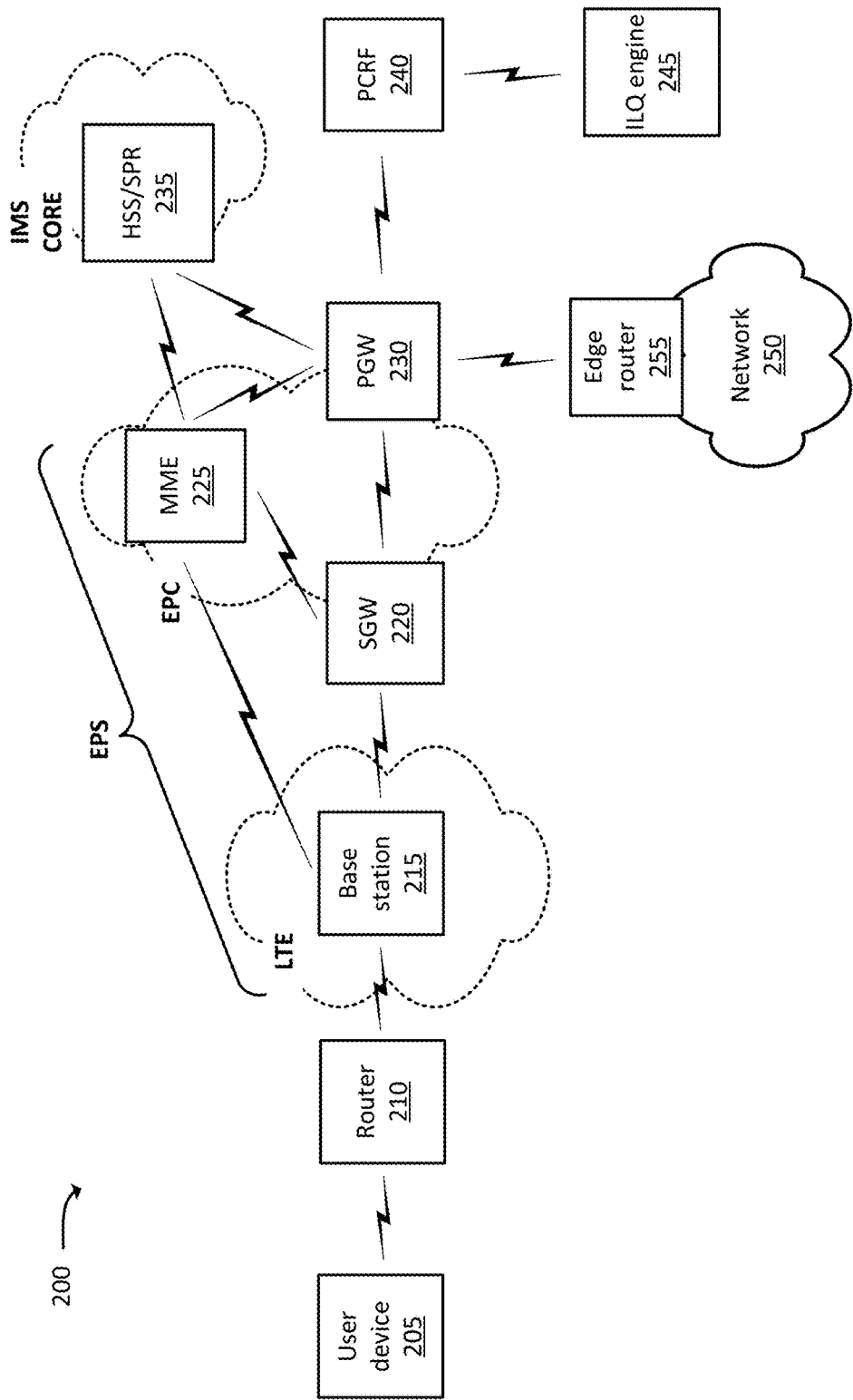
FIG. 2 illustrates an example environment in which systems and/or methods, described herein, may be implemented.

FIG. 2 illustrates an example environment 200, in which systems and/or methods described herein may be implemented. As shown in FIG. 2, environment 200 may include user device 205, router 210, base station 215, serving gateway ("SGW") 220, mobility management entity device ("MME") 225, PGW 230, home subscriber server ("HSS")/subscriber profile repository ("SPR") 235 (hereinafter referred to as "HSS/SPR 235"), policy charging and rules function ("PCRF") 240, inter-layer QoS engine 245 (hereinafter referred to as "ILQ engine 245"), and network 250.

The quantity of devices and/or networks, illustrated in FIG. 2, is provided for explanatory purposes only. In practice, there may be additional devices and/or networks; fewer devices and/or networks; different devices and/or networks; or differently arranged devices and/or networks than illustrated in FIG. 2. Alternatively, or additionally, one or more of the devices of environment 200 may perform one or more functions described as being performed by another one or more of the devices of environment 200. Devices of environment 200 may interconnect via wired connections, wireless connections, or a combination of wired and wireless connections.

Environment 200 may include an evolved packet system ("EPS") that includes an LTE network and/or an evolved packet core ("EPC") network that operate based on a third generation partnership project ("3GPP") wireless communication standard. The LTE network may be, or may include, a radio access network ("RAN") that includes one or more base stations 215, some or all of which may take the form of an eNodeB ("eNB"), via which user device 205 may communicate with the EPC network. The EPC network may include one or more SGWs 220, MMEs 225, and/or PGWs 230, and may enable user device 205 to communicate with network 250 and/or an IP multimedia subsystem ("IMS") core network. The IMS core network may include HSS/SPR 235, and may manage authentication, session initiation, account information, a user profile, etc. associated with user device 205.

User device 205 may include any computation and communication device, such as a wireless mobile communication device that is capable of communicating with one or more networks (e.g., network 250 and/or the IMS core). For example, user device 205 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a personal gaming system, or another type of mobile computation and communication device. User device 205 may send traffic to and/or receive traffic from network 250 via router 210, base station 215, SGW 220, PGW 230, and/or edge router 255.

Router 210 may include a network device that routes traffic received from user device 205 to an intended destination (e.g., to network 250) and/or routes traffic (e.g., traffic received from network 250) to user device 205. In some implementations, router 210 may communicate with base station 215 via, for example, a wireless connection (e.g., via one or more wireless bearers, such as LTE bearers). In some implementations, router 210 may communicate with user device 205 via a wireless connection, such as via a Bluetooth connection, an IEEE 802.11 connection (sometimes referred to as "Wi-Fi"), or another type of wireless connection. Router 210 may alternatively, or additionally, communicate with user device 205 via a wired connection.

Base station 215 may include one or more network devices that receive, process, and/or transmit traffic, such as calls, audio, video, text, and/or other data, destined for and/or received from user device 205. In one example, base station 215 may be an eNB device and may be part of the LTE network. Base station 215 may receive traffic from and/or send traffic to network 250 via SGW 220 and PGW 230. Base station 215 may send traffic to and/or receive traffic from user device 205 via an air interface.

SGW 220 may include one or more network devices that gather, process, search, store, and/or provide information. For example, SGW 220 may include a gateway, a router, a modem, a switch, a firewall, a network interface card ("NIC"), a hub, a bridge, a proxy server, and/or some other type of device that processes and/or transfers traffic. SGW 220 may, for example, aggregate traffic received from one or more base stations 215 and may send the aggregated traffic to network 250 via PGW 230.

MME 225 may include one or more computation and communication devices that gather, process, search, store, and/or provide information. For example, MME 225 may perform operations to register user device 205 with the EPS, to establish bearer channels associated with a session with user device 205, to hand off user device 205 from the EPS to another network, to hand off user device 205 from the other network to the EPS, and/or to perform other operations. MME 225 may perform policing operations on traffic destined for and/or received from user device 205.

PGW 230 may include one or more network devices, or other types of computation and communication devices, that gather, process, search, store, and/or provide information in a manner described herein. For example, PGW 230 may include a gateway, a router, a modem, a switch, a firewall, a network interface card ("NIC"), a hub, a bridge, a proxy server, an optical add-drop multiplexer ("OADM"), and/or some other type of device that processes and/or transfers traffic. PGW 230 may aggregate traffic received from one or more SGWs 220, and may send the aggregated traffic to network 250. PGW 230 may also, or alternatively, receive traffic from network 250 and may send the traffic toward user device 205 via SGW 220, and/or base station 215.

HSS/SPR 235 may include one or more server devices, or other types of devices, that gather, process, search, store, and/or provide information. For example, HSS/SPR 235 may manage, update, and/or store, in a memory associated with HSS/SPR 235, profile information associated with a subscriber. The profile information may identify applications and/or services that are permitted for and/or accessible by the subscriber; a mobile directory number ("MDN") associated with the subscriber; bandwidth or data rate thresholds associated with the applications and/or services;

information associated with the subscriber (e.g., a username, a password, etc.); rate information; minutes allowed for a subscriber; and/or other information. The subscriber may be associated with, for example, user device 205. Additionally, or alternatively, HSS/SPR 235 may perform authentication, authorization, and/or accounting operations associated with the subscriber and/or a communication session with user device 205.

PCRF 240 may include one or more server devices, or other types of devices, that aggregate information sent to and received from the EPC network and/or other sources. PCRF 240 may receive information regarding policies and/or subscriptions from one or more sources, such as subscriber databases and/or from one or more users (such as, for example, an administrator associated with PCRF 240), and may output policy information to one or more devices that enforce the policies, such as PGW 230.

ILQ engine 245 may include one or more server devices, or other types of devices, that store, receive, and/or output information that correlates QoS levels regarding various layers of the OSI model. The information stored by ILQ engine 245 may facilitate the application of various QoS techniques by user device 205, router 210, PGW 230, and/or other devices. In some implementations, ILQ engine 245 may include an API, via which an administrator, third party application developers, and/or other users may provide information that correlates network layer QoS levels to link layer QoS levels, and/or link layer QoS levels to MPLS classes of service. ILQ engine 245 may, in some implementations, provide some or all of the stored and/or received information to PCRF 240.

Network 250 may include one or more wired and/or wireless networks. For example, network 250 may include a cellular network, a public land mobile network ("PLMN"), a second generation ("2G") network, a third generation ("3G") network, a fourth generation ("4G") network, a fifth generation ("5G") network, and/or another network. Additionally, or alternatively, network 250 may include a wide area network ("WAN"), a metropolitan area network ("MAN"), a telephone network (e.g., the Public Switched Telephone Network ("PSTN")), an ad hoc network, an intranet, PDN (e.g., the Internet), a fiber optic-based network, and/or a combination of these or other types of networks. In some implementations, network 250 may include a private enterprise network, and/or a private portion of a provider's back-end network.

Network 250 may include one or more edge routers 255, which may include one or more network devices act as ingress and egress points for traffic into and out of network 250. In some implementations, edge router 255 may include a label edge router, which operates using MPLS, IP, and/or other protocols. For example, edge router 255 may receive MPLS packets from outside of network 250, extract IP packets from the MPLS packets, and may forward the extracted IP packets within network 250. Further, edge router 255 may receive IP packets from within network 250, encapsulate the IP packets in MPLS packets, and forward the MPLS packets to a destination outside of network 250.

FIGS. 3A and 3B illustrate example data structures 300 and 350 that may be stored by ILQ engine 245. Data structures 300 and 350 may serve as, or be incorporated in, traffic flow templates ("TFTs"), which may be used by user device 205 and/or router 210 when performing inter-layer QoS enforcement. Data structures 300 and 350 may include information that correlates QoS levels of one layer of the OSI model to QoS levels of another layer of the OSI model. The information stored in data structures 300 and 350 may be received (e.g., by ILQ engine 245) from, for example, an administrator associated with network 250, a subscriber associated with user device 205 and/or router 210, or from another source. In some implementations, the information stored in data structures 300 and 350 may be received via an API, which allows a user (e.g., a subscriber associated with user device 205 and/or router 210) to provide information that correlates QoS levels of one layer of the OSI model to QoS levels of another layer of the OSI model. As mentioned above, ILQ engine 245 may provide some or all of the information stored in data structures 300 and/or 350 to PCRF 240.

In some implementations, data structures 300 and/or 350 may be maintained on a per-subscriber (or per-set of subscribers) basis. For example, one user device 205 or router 210 (or set of user devices 205 or routers 210) may be associated with one instance of data structure 300, while another user device 205 or router 210 may be associated with another instance of data structure 300. In some implementations, data structures 300 and/or 350 may be maintained on a "system-wide" basis, where the information stored therein may be indiscriminately applicable to any user device 205 or router 210.

As shown in FIG. 3A, data structure 300 may store information that correlates network layer QoS levels (e.g., the "DSCP value(s)" column) to link layer QoS levels (e.g., the "QCI(s)" column). The "DSCP value(s)" column may include DSCP values, which denote a level of QoS, at the network layer, associated with traffic marked with particular DSCP values. For example, the values stored in these fields may correspond to values according to one or more standards or Requests for Comment ("RFCs") that describe possible DSCP values (e.g., RFCs 2474, 2475, 3246, 3260, and 4594). As shown, a field in this column may include the value "0," which may be a "catch-all" value—in that DSCP values, in traffic, which do not correspond to the values in the other fields, may be considered to correspond to the "catch-all" value.

As further shown, the "QCI(s)" field may include one or more QCIs, which denote a level of QoS, at the link layer, associated with traffic sent or received via a bearer associated with a particular QCI. In some implementations, a particular DSCP value (or set of DSCP values) may be associated with multiple QCIs. For instance, as shown in FIG. 3A, the DSCP value "EF" is associated with QCIs "1* and 7." The asterisk in this QCIs field may conceptually denote that traffic marked with the "EF" DSCP value, from a particular subscriber, is associated with QCI 1, if a QCI 1 bearer is available for the subscriber. For example, a QCI 1 bearer may be available for the subscriber if the subscriber has subscribed to a service whereby a QCI 1 bearer is available for the subscriber, if network resources allow for a QCI 1 bearer to be available, etc. If a QCI 1 bearer is not available for the subscriber, then the information in this field denotes that traffic marked with the "EF" DSCP value should be associated with a QCI 7 bearer.

While an example was presented above, in which two QCIs are present in the same field, in some implementations, more than two QCIs may be present in a particular field. In some such implementations, the association of a QCI with a DSCP value may be made in a hierarchical or rule-based fashion.

As further shown, data structure 300 may also include a description field. The description field may include, for example, human-readable descriptions of types of traffic associated with DSCP values and/or QCIs.

FIG. 3B illustrates another example data structure 350, which may also store information that correlates network layer QoS levels (e.g., the "DSCP class selector(s)" column) to link layer QoS levels (e.g., the "QCI(s)" column). The information in 350 may be similar to the information stored in data structure 300, except that the network layer QoS levels may be presented as DSCP class selectors (e.g., as presented in RFC 4594), instead of DSCP values in the formatting provided above with respect to data structure 300.

As described further below, the information stored in data structures 300 and 350 may be stored and/or utilized by user device 205 and/or router 210. For example, when outputting traffic, user device 205 and/or router 210 may identify a DSCP value associated with the traffic and, based on the information stored in data structure 300, output the traffic via an appropriate bearer (e.g., a bearer having a QCI that matches the information indicated in data structure 300).

FIG. 4 illustrates an example data structure 400 that may store information correlating link layer QoS levels (e.g., QCIs) to MPLS traffic classes. In some implementations, the information in the "MPLS traffic class" field may be referred to as a class of service ("CoS"), experimental ("EXP") bits (e.g., as described in RFCs 5462 and 3032), traffic class, 802.1p bits (e.g., as standardized by the Institute of Electrical and Electronics Engineers ("IEEE") in the documents "IEEE Standard for Local and Metropolitan Area Networks; Virtual Bridged Local Area Networks," IEEE Std 802.1QTM-2005, May 19, 2006 and "Media Access Control (MAC) Bridges and Virtual Bridge Local Area Networks," IEEE Std 802.1QTM-2011, Aug. 31, 2011), and/or by another name.

As described further below, the information stored in data structure 400 may be stored and/or utilized by PGW 230. For example, PGW 230 may identify a QCI associated with received traffic (e.g., a QCI associated with a bearer via which traffic was received). Based on the information in data structure 400, PGW 230 may identify an MPLS traffic class (e.g., class of service, EXP bits, traffic class, 802.1p bits, etc.) associated with the traffic, and may encapsulate the traffic in one or more MPLS packets. The MPLS packets may include header information that specifies the corresponding MPLS traffic class, and PGW 230 may forward the MPLS packets (e.g., to network 250).

Figure 5A:
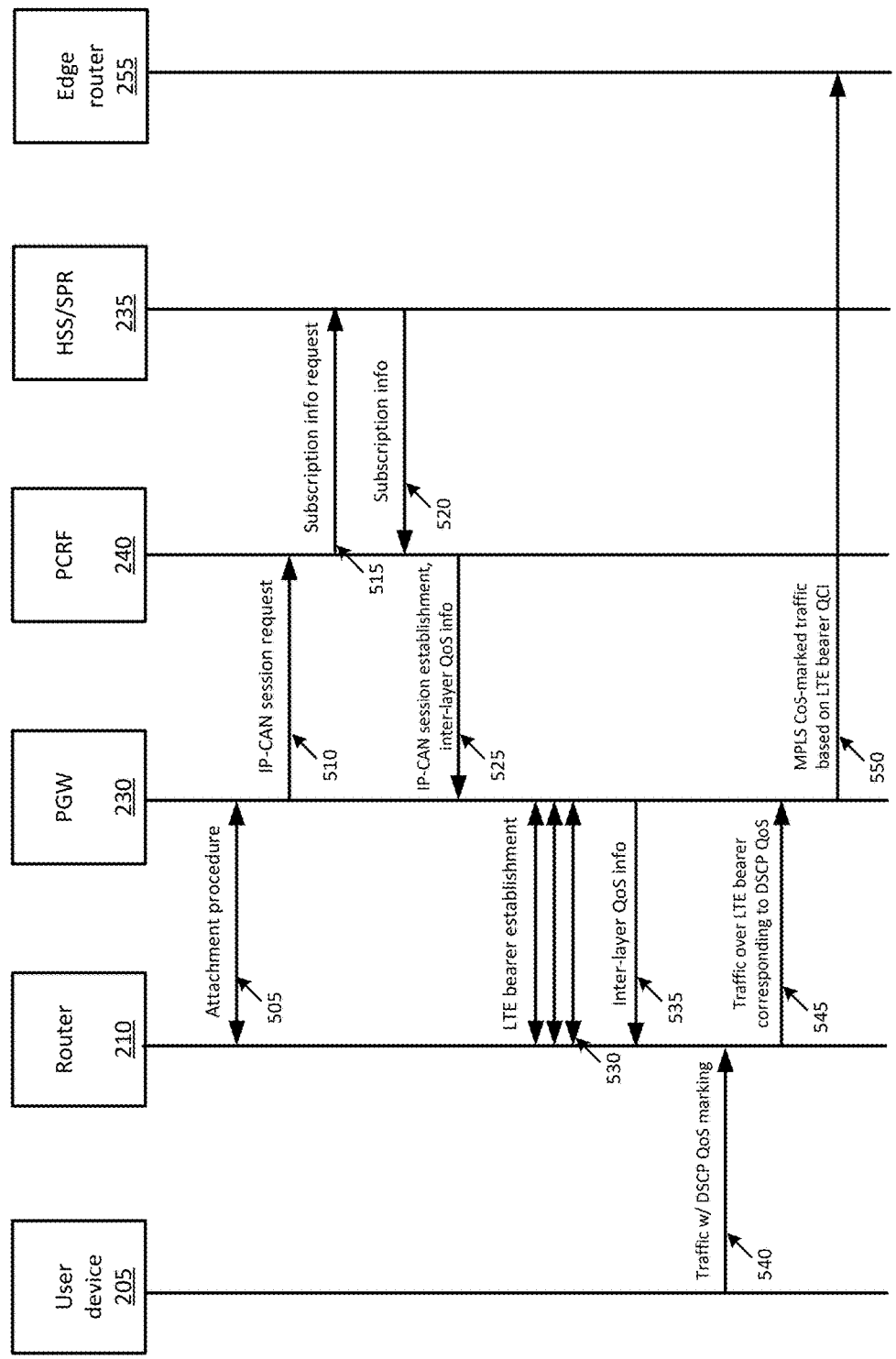
FIGS. 5A, 5B, 6A, 6B, 7A, and 7B illustrate example signal flows for performing inter-layer QoS enforcement, in accordance with some implementations.
Figure 5B:
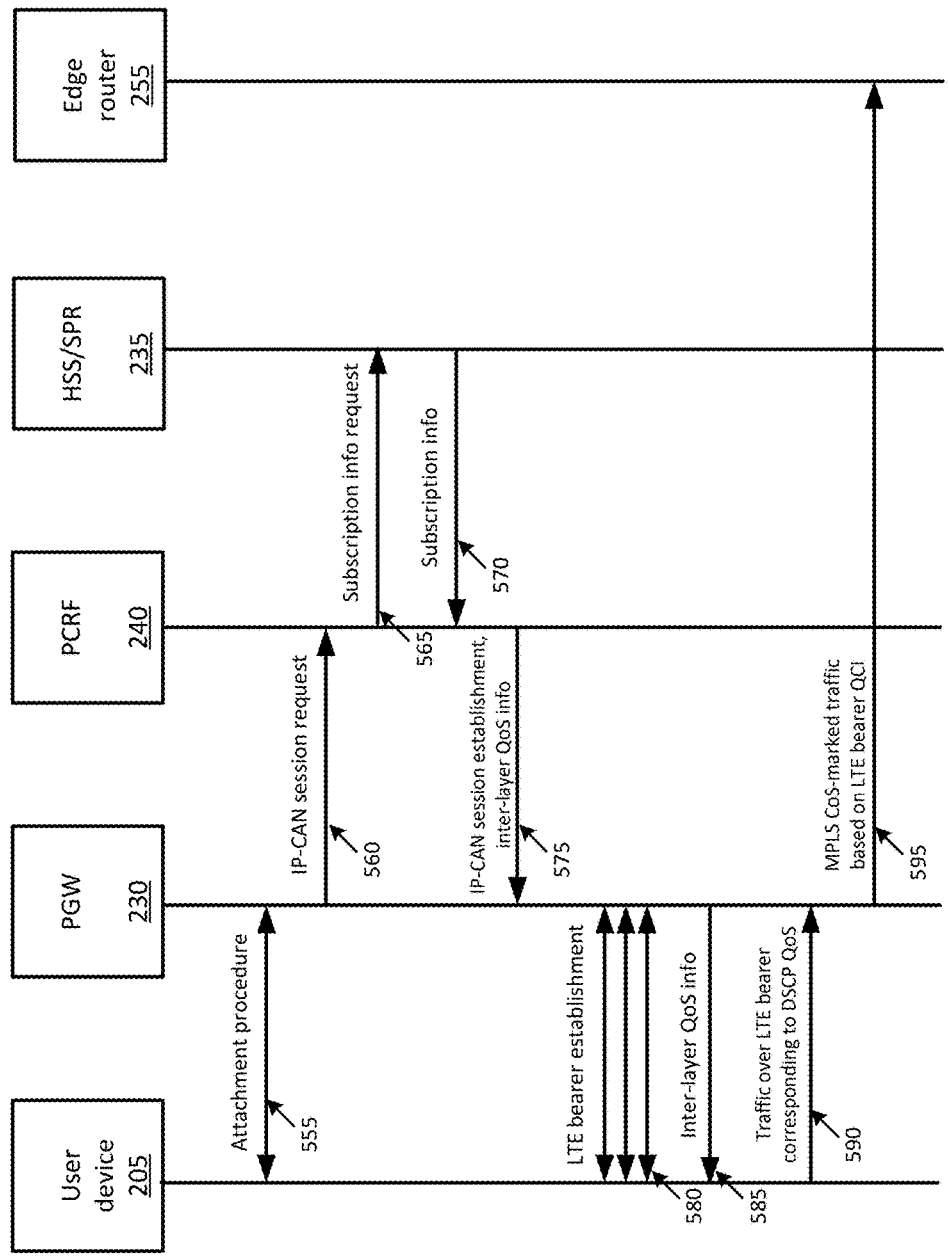
Figure 6A:
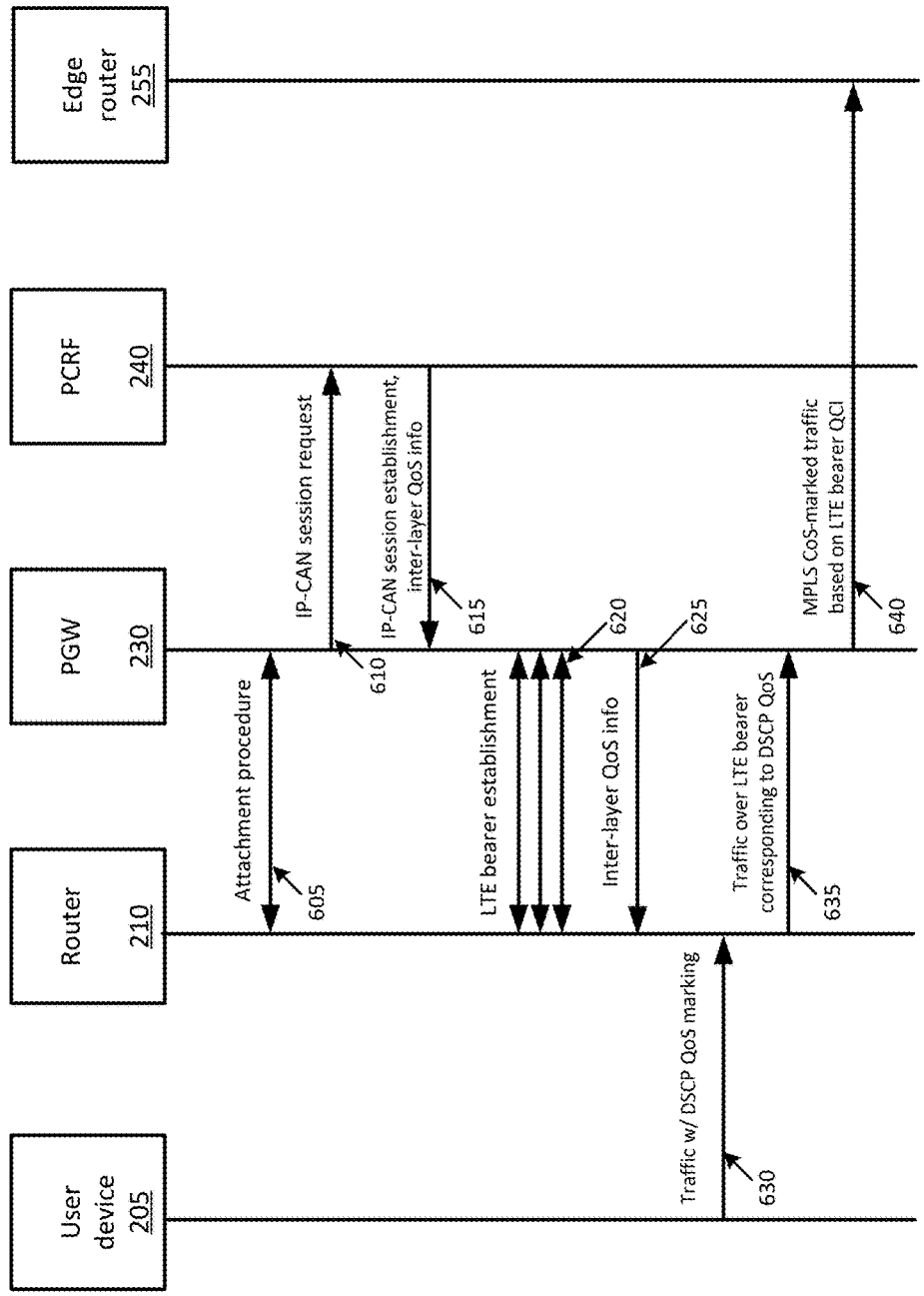
Figure 6B:
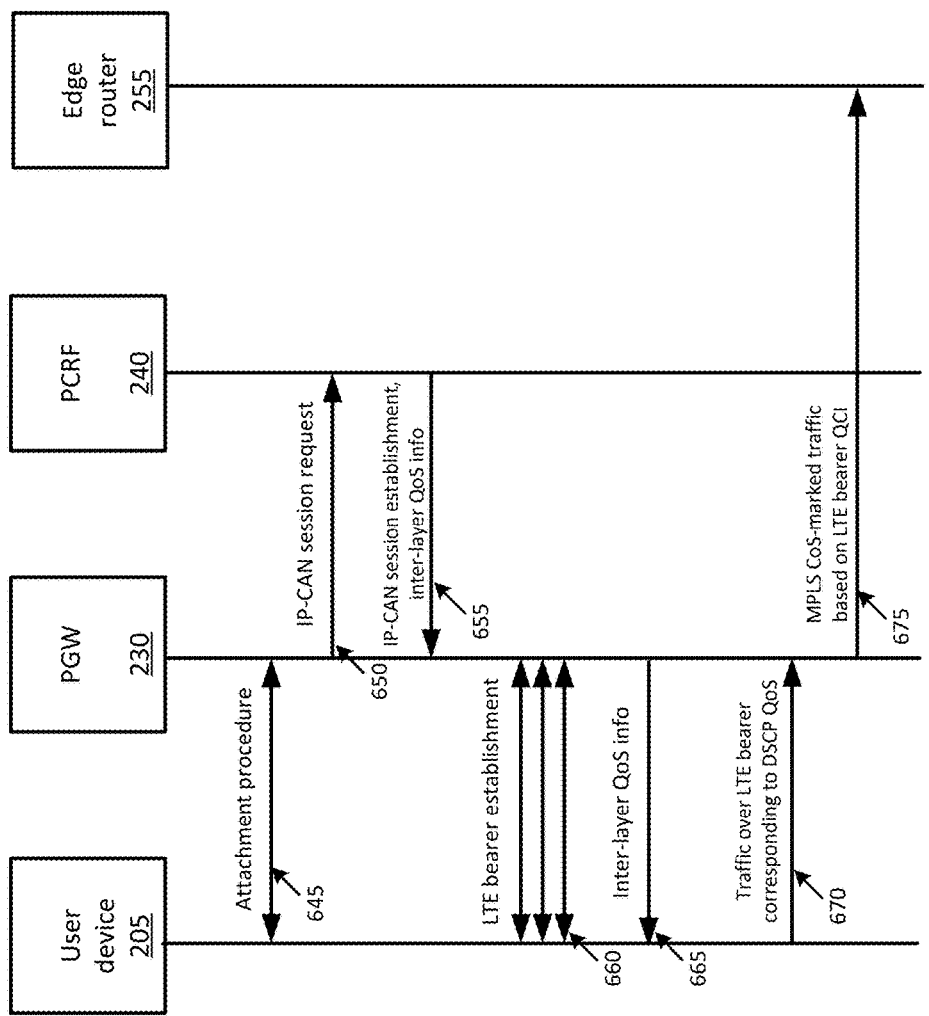

FIGS. 5A, 5B, 6A, and 6B illustrate examples of inter-layer QoS enforcement, according to some examples described herein. FIGS. 5A and 5B illustrate a subscription-based implementation, while FIGS. 6A and 6B illustrate an implementation that is not subscription-based. Further, FIGS. 5A and 6A illustrate an implementation in which router 210 and PGW 230 perform inter-layer QoS enforcement, while FIGS. 5B and 6B illustrate an implementation in which user device 205 and PGW 230 perform inter-layer QoS enforcement. Some of the signaling in these figures may be similar (e.g., signals 505, 555, 605, and 645); thus, the descriptions of some of these signals may be more briefly described with respect to one figure than another.

As shown in FIG. 5A, router 210 and PGW 230 may perform (at 505) an attachment procedure. The attachment procedure may include, for example, an attachment procedure according to an LTE standard. While not shown in the figure for the sake of conciseness, the attachment procedure may involve one or more other devices (e.g., base station 215, SGW 220, and MME 225). In this sense, the signal flow shown in this figure (and/or in other figures) may be considered to be a simplified representation of actual signal flows via which the attachment procedure may occur in practice. For example, the attachment procedure may include an attach request (not shown), sent by router 210 via base station 215. The attachment procedure may allow router 210 to be registered with PGW 230, to facilitate connectivity between PGW 230 and router 210.

PGW 230 may send (at 510) an IP-Connectivity Access Network ("IP-CAN") request to PCRF 240. This request may be sent via, for example, a Gx interface (e.g., as described in the documents, 3GPP TS [Technical Specification] 29.211 V6.4.0, "Technical Specification Group Core Network and Terminals; Rx Interface and Rx/Gx Signalling Flows (Release 6)," June 2007; and 3GPP TS 29.212 V12.1.0, "Technical Specification Group Core Network and Terminals; Policy and Charging Control (PCC); Reference Points (Release 12)," June 2013).

The IP-CAN request may be made so that an IP-CAN session, associated with router 210, may be subsequently established. The IP-CAN session, once established, may facilitate IP connectivity between router 210 and PGW 230. In some implementations, PCRF 240 may perform policy enforcement or other functionality in order to determine whether an IP-CAN session should be permitted to be established.

PCRF may request (at 515) subscription information associated with router 210. The request may be sent to, for example, HSS/SPR 235. As described above, HSS/SPR 235 may store subscriber information, which may indicate whether router 210 is subscribed to a service associated with inter-layer QoS enforcement. The subscriber information may also, in some implementations, indicate parameters for the service (e.g., which QoS levels of one layer are associated with which QoS levels of another layer).

HSS/SPR 235 may output (at 520) the requested subscription information to PCRF 240. Although not shown, if the requested subscription information is not present (e.g., if router 210 is not associated with a subscription to a service whereby inter-layer QoS is enforced), HSS/SPR 235 may output an indication to PCRF 240, indicating that router 210 is not associated with such a subscription.

At 525, an IP-CAN session, associated with router 210, may be established. Further, PCRF 240 may output (at 525) inter-layer QoS information associated with router 210. This information may indicate, for instance, that router 210 is associated with a subscription to a service associated with inter-layer QoS enforcement. This information may also include parameters for the service (e.g., which QoS levels of one layer are associated with which QoS levels of another layer).

At 530, multiple LTE bearers may be established between router 210 and PGW 230. Although not shown, other devices (e.g., base station 215, SGW 220, and MME 225) may be involved in the establishment of the bearers. The established bearers may each be associated with different QoS levels (e.g., QCIs). As described above, the different QoS levels of the bearers may be indicated by the inter-layer QoS information provided by PCRF 240.

PGW 230 may also output (at 535) some or all of the inter-layer QoS information to router 210. For example, PGW 230 may output this information to router 210 before, after, or during the LTE bearer establishment (at 530). This information may be used by router 210 to facilitate inter-layer QoS enforcement for traffic sent to and/or received by traffic 210.

While signals 505-535 correspond to an example of the initiation of inter-layer QoS enforcement functionality for router 210, signals 540-550 correspond to inter-layer QoS enforcement being performed. For instance, router 210 may receive (at 540) traffic from user device 205, which may have previously registered with and/or attached to router 210. The traffic may include a QoS marking at the network layer, such as a DSCP value in a header of the traffic.

In the example shown in FIG. 5A, the traffic outputted by user device includes the network layer QoS marking. In practice, router 210 may additionally, or alternatively, apply a network layer QoS marking to the traffic (e.g., may add or modify a DSCP value associated with the received traffic).

Router 210 may identify a bearer via which the traffic should be transmitted, based on the DSCP value associated with the received traffic. For example, router 210 may use the inter-layer QoS information (received at 535) to identify a QCI, based on the DSCP value of the traffic. Router 210 may identify one of the bearers, established at 530, associated with the QCI, and may output (at 545) the traffic via the identified bearer.

PGW 230 may receive the traffic (e.g., via one or more other devices, such as base station 215 and SGW 220, not shown), and may identify an MPLS CoS, which should be applied to the traffic. For example, the subscription information (received at 520) may indicate a correlation between one or more CoSs and one or more QCIs. Using this information, PGW 230 may determine, based on the QCI of the bearer via which the traffic was received, which MPLS CoS should be applied to the traffic for subsequent forwarding. For example, PGW 230 may encapsulate the traffic in one or more MPLS packets, and may set header information (e.g., a CoS field, an EXP bit, a p-bit, etc.) of the MPLS packets to indicate the desired CoS.

PGW may output (at 550) the one or more MPLS packets to, for example, network 250. As described above, network 250 may include a set of edge routers 255, one of which may receive the one or more MPLS packets and may extract the original traffic (e.g., the traffic outputted by user device 205 at 540 and/or the traffic outputted by router 210 at 545). In this manner, the original network layer QoS, specified by user device 205 and/or 210, may be preserved within network 250 (and/or during subsequent communications to other destinations).

Although not shown, similar techniques may be used for traffic sent to user device 205, from network 250. For example, network 250 may output (e.g., via edge router 255) traffic, having a particular DSCP value and encapsulated in one or more MPLS packets according to a particular CoS to user device 205. PGW 230 may receive the one or more MPLS packets, and may identify a QCI associated with the particular CoS and/or the particular DSCP value. PGW 230 may extract the traffic from the MPLS packets (e.g., may remove some or all MPLS header information), and may forward the traffic to user device 205 via an established bearer that is associated with the identified QCI.

FIG. 5B illustrates another example signal flow for inter-layer QoS enforcement. As shown, user device 205 and PGW 230 may perform (at 555) an attachment procedure, PGW 230 may request (at 560) an IP-CAN session, and PCRF 240 may request and receive (at 565 and 570, respectively) subscription information associated with user device 205. An IP-CAN session, associated with user device 205, may be established (at 575). Further, PGW 230 may receive (at 575) inter-layer QoS information. As described above, the inter-layer QoS information may include information that aids PGW 230 and/or user device 205 in performing inter-layer QoS enforcement. Multiple LTE bearers may be established (at 580) between PGW 230 and user device 205. These LTE bearers may correspond to different QCIs, which may be indicated in the inter-layer QoS information received at 570. PGW 230 may further output (at 585) some or all of the inter-layer QoS information to user device 205.

User device 205 may identify traffic to be outputted to, for example, network 250. User device 205 may identify an application and/or a network layer QoS level (e.g., a DSCP value) associated with the traffic to be outputted. Based on the application and/or the network layer QoS level, user device 205 may determine via which bearer, of the bearers established at 575, the traffic should be outputted. User device 205 may output (at 590) the traffic via the selected bearer. Based on via which bearer the traffic was received, PGW 230 may determine an MPLS CoS associated with the traffic, and may encapsulate the traffic in one or more MPLS packets that are associated with the appropriate MPLS CoS. PGW 230 may forward (at 595) the MPLS packets to network 250 (e.g., to edge router 255). When traffic is sent from network 250 to user device 205, similar techniques may be used to ensure inter-layer enforcement.

FIG. 6A illustrates an example of inter-layer QoS enforcement, involving router 210. As mentioned above, the example shown in FIG. 6A may correspond to an implementation in which a subscription to an inter-layer QoS service is not necessary. As shown, router 210 and PGW 230 may perform (at 605) an attachment procedure, PGW 230 may request (at 610) an IP-CAN session, and an IP-CAN session, associated with router 210, may be established (at 615). Further, PGW 230 may receive (at 615) inter-layer QoS information from PCRF 240. PCRF 240 may receive the information from, for example, ILQ engine 245 (e.g., prior to receiving the IP-CAN session request at 610, or in some instances, based on receiving the IP-CAN session request at 610). As described above, the inter-layer QoS information may include information that aids PGW 230 and/or router 210 in performing inter-layer QoS enforcement. Multiple LTE bearers may be established (at 620) between PGW 230 and user device 205. These LTE bearers may correspond to different QCIs, which may be indicated in the inter-layer QoS information received at 615. PGW 230 may further output (at 625) some or all of the inter-layer QoS information to user device 205.

User device 205 may output (at 630) traffic to router 210. The traffic may include a DSCP value. Additionally, or alternatively, router 210 may add or modify a DSCP value associated with the traffic. Based on the DSCP value, router 210 may determine via which bearer, of the bearers established at 620, the traffic should be outputted. Router 210 may output (at 635) the traffic via the selected bearer. Based on via which bearer the traffic was received, PGW 230 may determine an MPLS CoS associated with the traffic, and may encapsulate the traffic in one or more MPLS packets that are associated with the appropriate MPLS CoS. PGW 230 may forward (at 640) the MPLS packets to network 250 (e.g., to edge router 255). When traffic is sent from network 250 to router 210, similar techniques may be used to ensure inter-layer enforcement.

FIG. 6B illustrates an example of inter-layer QoS enforcement, in which user device 205 performs functions relating to inter-layer QoS enforcement. As mentioned above, the example shown in FIG. 6B may correspond to an implementation in which a subscription to an inter-layer QoS service is not necessary. As shown, user device 205 and PGW 230 may perform (at 645) an attachment procedure, PGW 230 may request (at 650) an IP-CAN session, and an IP-CAN session, associated with user device 205, may be established (at 655). Further, PGW 230 may receive (at 655) inter-layer QoS information. As described above, the inter-layer QoS information may include information that aids PGW 230 and/or user device 205 in performing inter-layer QoS enforcement. Multiple LTE bearers may be established (at 660) between PGW 230 and user device 205. These LTE bearers may correspond to different QCIs, which may be indicated in the inter-layer QoS information received at 615. PGW 230 may further output (at 665) some or all of the inter-layer QoS information to user device 205.

User device 205 may identify traffic to be outputted to, for example, network 250. User device 205 may identify an application and/or a network layer QoS level (e.g., a DSCP value) associated with the traffic to be outputted. Based on the application and/or the network layer QoS level, user device 205 may determine via which bearer, of the bearers established at 660, the traffic should be outputted. User device 205 may output (at 670) the traffic via the selected bearer. Based on via which bearer the traffic was received, PGW 230 may determine an MPLS CoS associated with the traffic, and may encapsulate the traffic in one or more MPLS packets that are associated with the appropriate MPLS CoS. PGW 230 may forward (at 675) the MPLS packets to network 250 (e.g., to edge router 255). When traffic is sent from network 250 to user device 205, similar techniques may be used to ensure inter-layer enforcement.

Figure 7A:
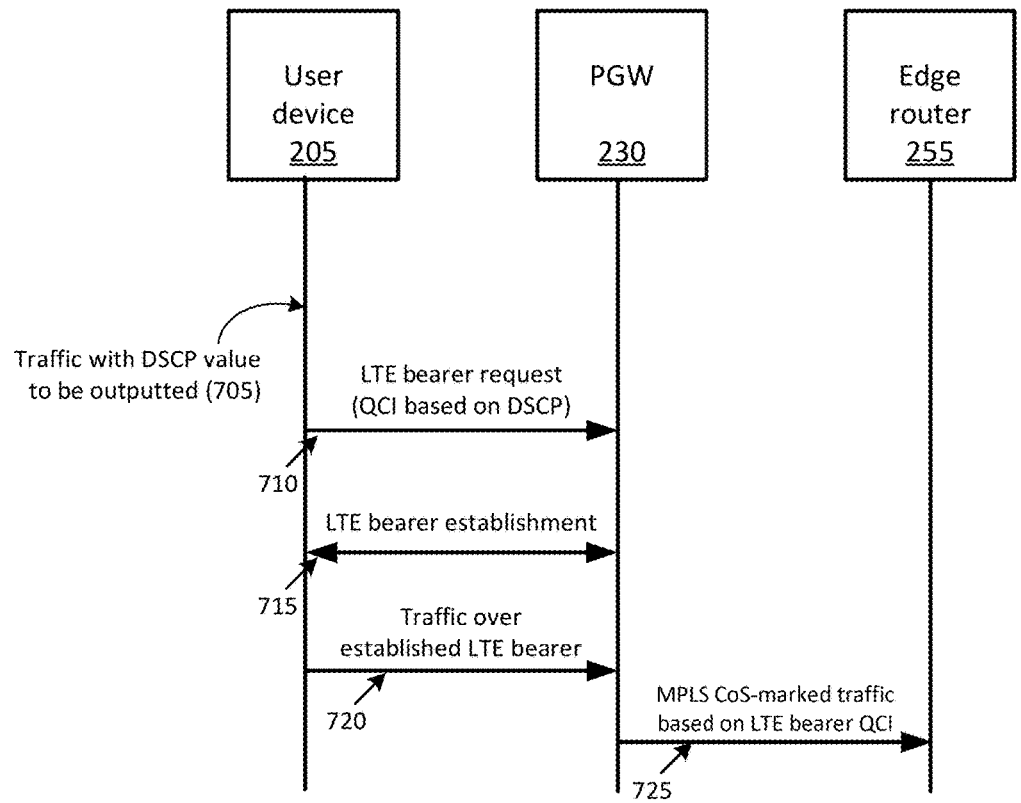

FIG. 7A illustrates an example of inter-layer QoS enforcement, in which bearers may be established on an "on demand" or an "as needed" basis. Although not shown for the sake of conciseness, some of the signaling shown in FIG. 7A may occur as part of an attachment procedure between user device 205 and PGW 230. For example, some similar signaling to the signaling shown above with respect to FIGS. 5A, 5B, 6A, and 6B (e.g., signals 645-655 and 665) may occur prior to, or concurrently with, some of the signals shown in FIG. 7A. Further, while FIG. 7A is described in the context of user device 205, another device (e.g., router 210) may perform some or all of the functions described below with respect to user device 205.

As shown, user device 205 may identify (at 705) traffic to be outputted (e.g., to network 250). User device 205 may determine a network layer QoS level associated with the traffic (e.g., based on a DSCP value in a header of the traffic, based on a type of the traffic, based on an application associated with the traffic, etc.). User device 205 may identify a link layer QoS level (e.g., a QCI) associated with the network layer QoS level. For example, user device 205 may store inter-layer QoS information that correlates DSCP values to QCIs. User device 205 may have received the inter-layer QoS information as part of an attachment procedure with PGW 230, or at another time (e.g., during a configuration or update process performed by a network service provider associated with PGW 230).

User device 205 may request (at 710) that a bearer, associated with the identified QCI, be established between user device 205 and PGW 230. In some implementations, PGW 230 may perform policy or rule enforcement to determine whether the bearer should be established (e.g., whether network resources are available, whether user device 205 is subscribed to or otherwise approved for the requested QCI, etc.). Assuming that PGW 230 determines that the bearer is permissible to be established, the bearer may be established (at 715) between user device 205 and PGW 230. Although not shown in the figure, if PGW 230 does not determine that the bearer with the requested QCI should be established, PGW 230 may notify user device 205 that the request was rejected, and/or may indicate, to user device 205, an alternate QCI that would be permissible. User device 205 may output (at 720) the traffic over the established LTE bearer, and PGW 230 may apply MPLS-level QoS treatment to the traffic when forwarding (at 725) the traffic to edge router 255. In some situations, a bearer with the appropriate QCI may have already been previously established. In these situations, user device 205 may forgo requesting that a new bearer be established, and may output (at 720) the traffic via the existing bearer.

Figure 7B:
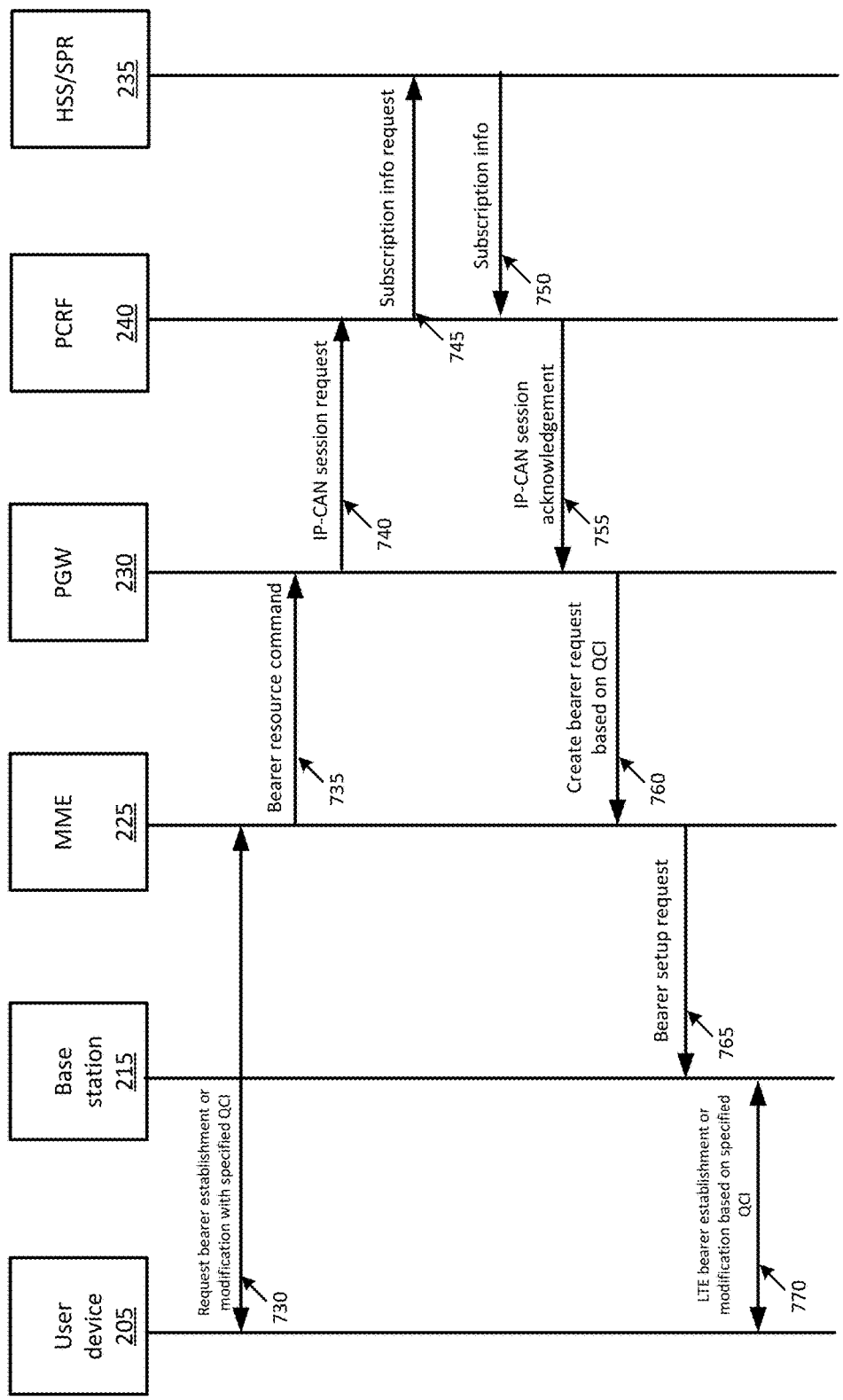

FIG. 7B illustrates an example of inter-layer QoS enforcement, in which user device 205 may specifically request the establishment of a bearer of a particular QCI. For example, user device 205 may request (at 730) the establishment of a bearer, and/or the modification of an existing set of bearers. User device 205 may make this request based on, for instance, inter-layer QoS information stored and/or received by user device 205. For example, user device 205 may identify that traffic, associated with a particular DSCP value, is to be outputted by an application associated with user device 205. User device 205 may compare the DSCP value to inter-layer QoS information, stored by user device 205, in order to determine a QCI level associated with the DSCP value. In a situation where user device 205 determines that a bearer, associated with the determined QCI level, has not been established, user device 205 may make the request (at 730) to establish the bearer, and may specify the determined QCI level in the request. In some implementations, the request may include inter-layer QoS information that maps the requested QCI to a set of DSCP values.

The request (made at 730) may be received by MME 225 (e.g., via base station 215). Based on receiving the request, MME 225 may send (at 735) a bearer resource command to PGW 230. The bearer resource command may identify, among other information, the QCI level indicated in the request (sent at 725) from user device 205.

The bearer resource command (sent at 735) may be received by PCRF 240 (e.g., via SGW 220). Based on the bearer resource command, PCRF 240 may request (at 740) the establishment of an IP-CAN session, or the modification of an existing IP-CAN session. In some implementations, based on the IP-CAN session request, PCRF 240 may verify whether user device 205 is authorized for the requested QCI level. For instance, PCRF 240 may request (at 745) subscription information from HSS/SPR 235. HSS/SPR 235 may, in some implementations, store subscription information, which may indicate whether user device 205 is authorized for the requested QCI level.

HSS/SPR 235 may output (at 750) the requested subscription information to PCRF 240. Although not shown, if the requested subscription information is not present (e.g., if user device 205 is not authorized for the QCI level, and/or is not associated with a subscription that allows user device 205 to request specific QCI levels), HSS/SPR 235 may output an indication to PCRF 240, indicating that user 205 is not associated with such a subscription, and/or is not authorized for the requested QCI level.

At 755, PCRF 240 may output an IP-CAN session acknowledgement, and an IP-CAN session may be established (or an existing IP-CAN session may be modified, based on the QCI level). PGW may output (at 760) a request to create a bearer that is associated with the requested QCI level. MME 225 may receive the request (e.g., via SGW 220), and may output (at 765) a bearer setup request to base station 215. The bearer setup request may indicate the QCI level specified in the request sent at 730). In some implementations, the bearer setup request (sent at 765) may be a request to establish an Evolved Universal Terretrial Radio Access Network Radio Access Bearer ("E-RAB"), and may indicate the requested QCI level.

Based on the bearer setup request (sent at 765), base station 215 may establish an LTE bearer (e.g., by establishing a Radio Resource Control ("RRC") channel), associated with the specified QCI level, with user device 205. In some implementations, base station 215 may modify an existing set of RRC channels when establishing the LTE bearer associated with the specified QCI level.

Once the bearer has been established (at 770), user device 205 may proceed to output traffic via the bearer. For example, user device 205 may store inter-layer QoS information that correlates DSCP values to QCI levels. Assume that the bearer established at 770 is associated with a QCI level of 1, and that inter-layer QoS information, stored by user device 205, indicates that a DSCP value of "EF" is correlated to QCI level 1. Further assume that user device 205 identifies that traffic, having a DSCP value of "EF," is to be outputted by user device 205. Based on the stored inter-layer QoS information, user device 205 may output this traffic over the established bearer that is associated with QCI level 1.

Figure 8:
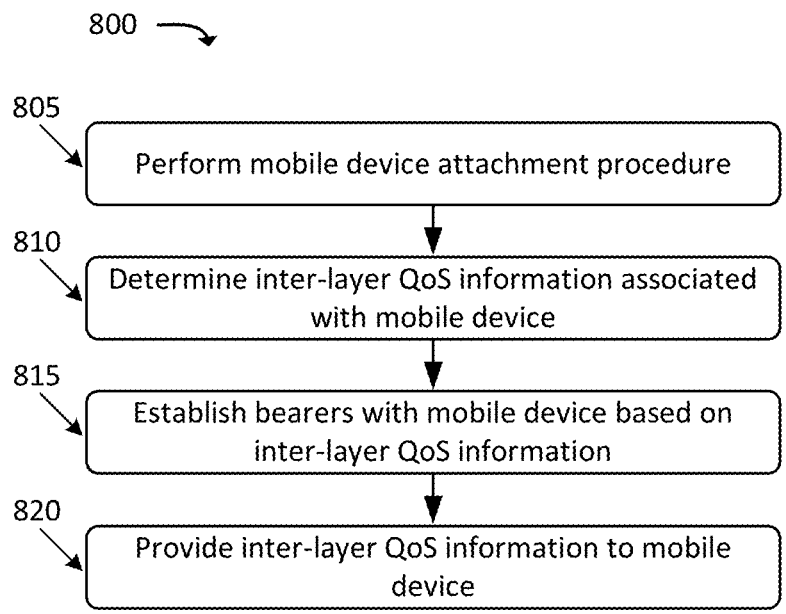
FIGS. 8-10 illustrate example processes for performing inter-layer QoS enforcement, in accordance with some implementations.
Figure 9:
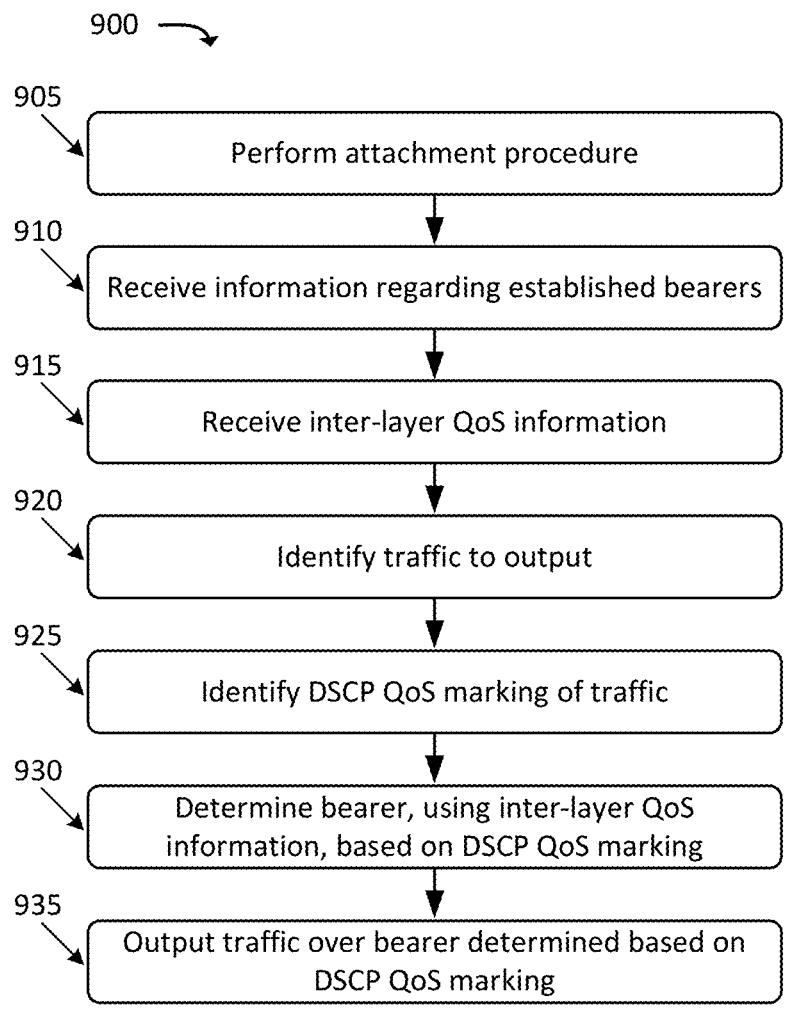
Figure 10:
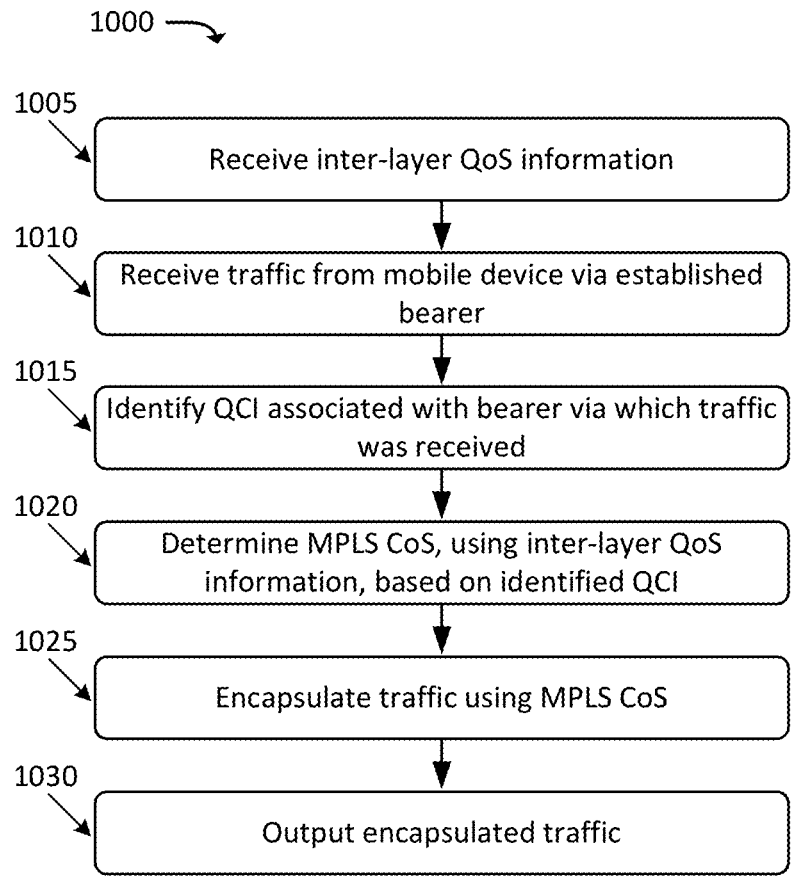

FIGS. 8-10 illustrate example processes for performing inter-layer QoS enforcement. In one example implementation, processes 800 and 1000 may be performed by PGW 230, and process 900 may be performed by user device 205 and/or router 210. In some implementations, some or all of processes 800, 900, and 1000 may be performed by one or more other devices in lieu of, or in conjunction with, the devices mentioned above. As used in the context of FIGS. 8 and 10, the term "mobile device" may refer to user device 205, router 210, and/or another suitable device.

Process 800 may include performing a mobile device attachment procedure (block 805). For example, as described above, PGW 230 may perform an attachment procedure with user device 205 and/or router 210.

Process 800 may also include determining inter-layer QoS information associated with the mobile device (block 810). For example, PGW 230 may determine an instance of data structure 300 and/or 350 associated with the mobile device, in order to determine a set of QCIs of bearers that should be established for the mobile device. As described above, the inter-layer QoS information may be received from PCRF 240 and/or from ILQ engine 245.

Process 800 may further include establishing bearers with the mobile device based on the inter-layer QoS information (block 815). For example, referring to the example information shown in FIG. 3A, PGW 230 may establish three bearers with the mobile device, where the bearers each correspond to a different one of QCI 1, QCI 7, and QCI 8.

Process 800 may also include providing some or all of the inter-layer QoS information to the mobile device (block 820). For instance, PGW 230 may output some or all of the contents of data structure 300 or 350 to the mobile device. This inter-layer QoS information may aid the mobile device in performing inter-layer QoS enforcement (e.g., may indicate which QCIs, of the established bearers, are associated with which DSCP values).

With respect to FIG. 9, process 900 is described below in the context of being performed by user device 205. However, as mentioned above, process 900 may be performed by router 210 and/or another device.

Process 900 may include performing an attachment procedure (block 905). For example, user device 205 may send an attach request to PGW 230, and perform other signaling associated with attachment.

Process 900 may also include receiving information regarding established bearers (block 910). For instance, as described above, a set of bearers, corresponding to different link layer QoS levels, may be established between user device 205 and PGW 230, based on the attachment procedure performed at block 905. User device 205 may receive information regarding the bearers (e.g., bearer identifiers) from PGW 230.

Process 900 may further include receiving inter-layer QoS information (block 915). For example, user device 205 may receive information that correlates network layer QoS levels (e.g., DSCP values) to link layer QoS levels (e.g., QCIs). User device 205 may receive the inter-layer QoS information from PGW 230 and/or from another source. The inter-layer QoS information may be received in conjunction with, before, or after the attachment procedure (at 905).

Process 900 may additionally include identifying traffic to output (block 920). For instance, an application (e.g., a voice call application, a video call application, a file transfer application, a gaming application, etc.) associated with user device 205 may indicate that traffic should be outputted to network 250.

Process 900 may also include identifying a DSCP QoS marking of the traffic (block 925). For instance, the application, from which the traffic is outputted, may include a DSCP value in a header of the traffic. Additionally, or alternatively, user device 205 may add or modify a DSCP value in a header of the traffic (e.g., based on the traffic type, an identity of the application, the application type, and/or another factor). In some implementations, the traffic may include encryption or encapsulation techniques, such as Generic Routing Encapsulation ("GRE") or IP Security ("IPSec"). These techniques may "hide" some or all of the content of the traffic, but may retain the DSCP QoS markings of the traffic. Thus, techniques described herein may be applicable even to encrypted or encapsulated traffic.

Process 900 may further include determining which bearer, of the established bearers, the traffic should be outputted, based on the inter-layer QoS information and the DSCP QoS marking (block 930). For example, user device 205 may use the inter-layer QoS information (received at block 915) to determine a QCI associated with the DSCP value of the traffic, and may identify a bearer, of the established bearers, that is associated with the identified QCI. Process 900 may additionally include outputting the traffic over the bearer that was determined based on the DSCP QoS marking (block 935).

Referring to FIG. 10, process 1000 may include receiving inter-layer QoS information (block 1005). For example, PGW 230 may receive inter-layer QoS information from PCRF 240 and/or ILQ engine 245. The inter-layer QoS information may correlate link layer QoS levels to MPLS traffic classes, and may, in some implementations, be in a format similar to data structure 400. PGW 230 may receive the inter-layer QoS information in conjunction with an attachment process between PGW 230 and a mobile device, and/or at another time (e.g., independent of any such attachment process).

Process 1010 may further include receiving traffic from a mobile device via an established bearer (block 1010). For example, PGW 230 may receive traffic from a mobile device via one of a group of bearers associated with the mobile device (e.g., as established at block 815 of FIG. 8), or via a bearer established upon a request by the mobile device (e.g., as requested at signal 710 of FIG. 7A).

Process 1000 may also include identifying a QCI associated with the bearer via which the traffic was received (block 1015), and determining, using the inter-layer QoS information, an MPLS traffic class (e.g., a CoS) associated with the QCI (block 1020). For example, PGW 230 may use the information in data structure 400 to determine an MPLS CoS associated with the QCI of the bearer via which the traffic was received.

Process 1000 may additionally include encapsulating the traffic, using the MPLS CoS (block 1025). For example, PGW 230 may encapsulate the traffic in one or more MPLS packets, and may mark a header of the packets with the MPLS CoS determined at block 1020.

Process 1000 may also include outputting the encapsulated traffic (block 1030). For instance, PGW 230 may forward the encapsulated traffic to network 250. At the MPLS layer, the encapsulated traffic may receive QoS treatment, at the MPLS layer, according to the marked CoS. As described above, an edge router 255, associated with network 250, may receive the encapsulated traffic and extract the original traffic (e.g., the traffic received at block 1010). The extracted traffic may subsequently receive QoS treatment, at the network layer, according to a network layer QoS marking (e.g., a DSCP value) associated with the traffic.

Figure 11:
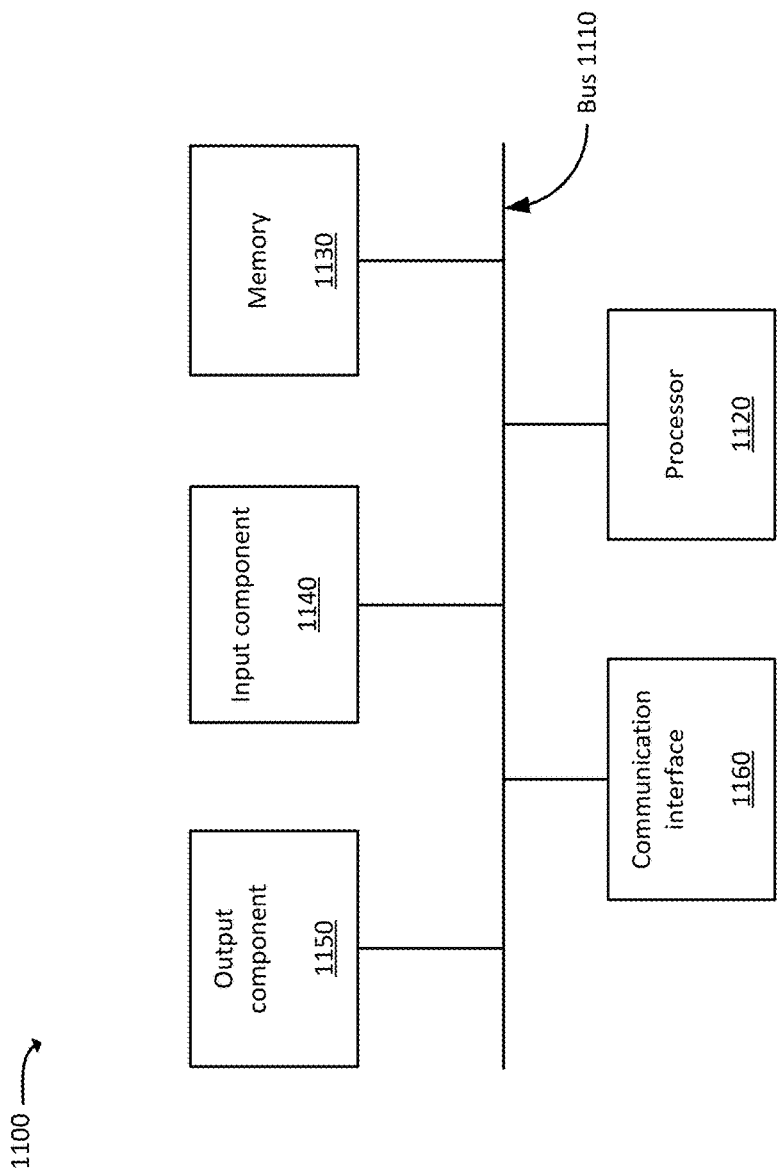
FIG. 11 illustrates example components of one or more devices, according to one or more implementations described herein.

FIG. 11 is a diagram of example components of device 1100. One or more of the devices described above (e.g., with respect to FIGS. 1A, 1B, 5A, 5B, 6A, 6B, and 7) may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 8-10, the order of the blocks may be modified in other implementations. Further, non-dependent blocks may be performed in parallel.

Further, while examples above describe network layer QoS levels in terms of DSCP values and link layer QoS levels in terms of QCIs, in practice, other techniques of identifying QoS levels may be used. Additionally, while examples above describe inter-layer QoS enforcement in terms of the network layer, the link layer, and MPLS, in practice, QoS levels of other layers may be enforced from layer to layer using similar techniques.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIG. 2), in practice, additional, fewer, or different, connections or devices may be used. For example, while a direct connection is not shown, in FIG. 2, between ILQ engine 245 and PGW 230, in some implementations, ILQ engine 245 and PGW 230 may communicate without the intervention of PCRF 240. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance.

Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
   receiving, by a network device, subscription information indicating that a particular device is subscribed to a service that provides link layer quality of service ("QoS") treatment of traffic, associated with the particular device, wherein the subscription information specifies a set of link layer QoS levels that have been subscribed to by the particular device;
   storing, by a network device, inter-layer QoS information, the inter-layer QoS information indicating:
      the set of link layer QoS levels to which the particular device is subscribed,
      a set of network layer QoS levels that are associated with the set of link layer QoS levels, and
      a set of Multiprotocol Label Switching ("MPLS") QoS levels that are associated with the set of link layer QoS levels;
   receiving, by the network device, information indicating that an attachment procedure has been initiated between the particular device and a cellular telecommunications network with which the network device is associated;
   establishing, by the network device and based on the indication that the attachment procedure has been initiated, a set of bearers with the particular device, the set of bearers including one or more bearers that correspond to the set of link layer QoS levels;
   outputting, by the network device and to the particular device, information regarding the set of network layer QoS levels that are associated with the set of link layer QoS levels, wherein the outputted information allows the particular device to select a particular bearer, of the set of bearers, via which to output traffic to the network device;
   receiving, by the network device and from the particular device, traffic via the particular bearer;
   identifying, by the network device, via which bearer, of the set of bearers, the traffic was received from the particular device;
   determining, by the network device, a particular MPLS QoS level associated with the received traffic, the determining being based on the inter-layer QoS information and a link layer QoS level associated with the particular bearer,
      the determining further being based on the identification of the bearer via which the traffic was received; and
   outputting, by the network device and to a packet data network ("PDN"), MPLS traffic that is based on the received traffic, the MPLS traffic including information indicating the particular MPLS QoS level that was determined based on the link layer QoS level associated with the particular bearer.

2. The method of claim 1, wherein the set of link layer QoS levels includes a set of Long Term Evolution ("LTE") QoS Class Identifiers ("QCIs").

3. The method of claim 1, wherein the set of network layer QoS levels includes at least one of:
   a set of Differentiated Service ("DiffServ") Code Point ("DSCP") values, or
   a set of DSCP class selectors.

4. The method of claim 1, wherein the set of MPLS QoS levels includes at least one of:
   a set of MPLS traffic classes,
   a set of MPLS experimental ("EXP") values,
   a set of class of service ("CoS") values, or
   a set of bits according to an Institute of Electrical and Electronics Engineers ("IEEE") 802.1p standard.

5. The method of claim 1, wherein the network device is a packet data network gateway ("PGW"), the outputting including:
   outputting the MPLS traffic to the PDN from the PGW.

6. The method of claim 1, further comprising:
   receiving at least a portion of the inter-layer QoS information from a policy charging and rules function ("PCRF") based on the attachment procedure performed between the particular device and the network device.

7. The method of claim 1, wherein the information regarding the set of network layer QoS levels that are associated with the set of link layer QoS levels, is first information and wherein the particular device is a first device, the method further comprising:
   outputting, to a second device, second information regarding the set of network layer QoS levels that are associated with the set of link layer QoS levels, wherein the second set of information specifies a different correlation between the set of network layer QoS levels and the set of link layer QoS levels than is specified by the first information.

8. The method of claim 1, wherein each bearer, of the set of bearers, is associated with a different link layer QoS, of the set of link layer QoS levels.

9. A system, comprising:
   a set of network devices configured to:
      receive subscription information indicating that a particular device is subscribed to a service that provides link layer quality of service ("QoS") treatment of traffic, associated with the particular device, wherein the subscription information specifies a set of link layer QoS levels that have been subscribed to by the particular device;
      store inter-layer QoS information, the inter-layer QoS information indicating:
         the set of link layer QoS levels to which the particular device is subscribed,
         a set of network layer QoS levels that are associated with the set of link layer QoS levels, and
         a set of Multiprotocol Label Switching ("MPLS") QoS levels that are associated with the set of link layer QoS levels;
      receive information indicating that an attachment procedure has been initiated between the particular device and a cellular telecommunications network with which the set of network devices is associated;
      establish, based on the indication that the attachment procedure has been initiated, a set of bearers with the particular device, the set of bearers including one or more bearers that correspond to the set of link layer QoS levels;
      output, to the particular device, information regarding the set of network layer QoS levels that are associated with the set of link layer QoS levels, wherein the outputted information allows the particular device to select a particular bearer, of the set of bearers, via which to output traffic to the network device;

receive, from the particular device, traffic via the particular bearer;

identify via which bearer, of the set of bearers, the traffic was received from the particular device;

determine, based on the inter-layer QoS information and a link layer QoS level associated with the identified particular bearer, via which the traffic was received, a particular MPLS QoS level associated with the received traffic; and output, to a packet data network ("PDN"), MPLS traffic that is based on the received traffic, the MPLS traffic including information indicating the particular MPLS QoS level that was determined based on the link layer QoS level associated with the particular bearer.

10. The system of claim 9, wherein the set of link layer QoS levels includes a set of Long Term Evolution ("LTE") QoS Class Identifiers ("QCIs"), wherein the set of network layer QoS levels includes at least one of:
   a set of Differentiated Service ("DiffServ") Code Point ("DSCP") values, or
   a set of DSCP class selectors, and wherein the set of MPLS QoS levels includes at least one of:
   a set of MPLS traffic classes,
   a set of MPLS experimental ("EXP") values,
   a set of class of service ("CoS") values, or
   a set of bits according to an Institute of Electrical and Electronics Engineers ("IEEE") 802.1p standard.

11. The system of claim 9, wherein the network device is a packet data network gateway ("PGW").

12. The system of claim 9, wherein the network device is further configured to:
   receive at least a portion of the inter-layer QoS information from a policy charging and rules function ("PCRF") based on the attachment procedure process performed between the particular device and the set of network devices.

13. The system of claim 9, wherein the information regarding the set of network layer QoS levels that are associated with the set of link layer QoS levels, is first information and wherein the particular device is a first device, wherein the network device is further configured to:
   output, to a second device, second information regarding the set of network layer QoS levels that are associated with the set of link layer QoS levels, wherein the second set of information specifies a different correlation between the set of network layer QoS levels and the set of link layer QoS levels than is specified by the first information.

14. The system of claim 9, wherein each bearer, of the set of bearers, is associated with a different link layer QoS, of the set of link layer QoS levels.

15. A method, comprising:

receiving, by a mobility management entity ("MME") of a wireless telecommunications network, a bearer establishment request from a user device, the bearer establishment request specifying a link layer quality of service ("QoS") level for the requested bearer;

outputting, by the MME and to a packet data network ("PDN") gateway ("PGW") of the wireless telecommunications network, a bearer resource command that identifies the link layer QoS level specified in the bearer establishment request from the user device;

outputting, by the PGW and to a policy charging and rules function ("PCRF") of the wireless telecommunications network, an Internet Protocol connectivity access network ("IP-CAN") session request;

determining, by the PCRF and based on subscription information associated with the user device, whether the user device is authorized for the specified link layer QoS level;

based on determining that the user device is authorized for the specified link layer QoS level, outputting, by the PCRF and to the PGW, an IP-CAN session acknowledgment;

based on receiving the IP-CAN session acknowledgement, outputting, by the PGW and to the MME, a create bearer request, the create bearer request including the specified link layer QoS level;

outputting, by the MME, based on receiving the create bearer request, a bearer setup request to a base station of the wireless telecommunications network, the bearer setup request including the specified link layer QoS level; and based on receiving the bearer setup request, establishing, by the base station, a bearer between the base station and the user device, the bearer being associated with the specified link layer QoS level.

16. The method of claim 15, wherein the link layer QoS level includes a Long Term Evolution ("LTE") QoS Class Identifier ("QCIs").

17. The method of claim 15, wherein of network layer QoS level includes at least one of:
   a Differentiated Service ("DiffServ") Code Point ("DSCP") value, or
   a DSCP class selector.

18. The method of claim 15, wherein the user device requests the establishment of the bearer based on:
   identifying traffic that is to be output by the user device to the wireless telecommunications network;
   identifying a network layer QoS level associated with the traffic; and
   determining, based on stored inter-layer QoS information, that the identified network layer QoS corresponds to the specified link layer QoS.

\* \* \* \* \*